_(12)_ United States Patent
Kline et al.

(10) Patent No.: US 7,474,620 B2
(45) Date of Patent: Jan. 6, 2009

(54) COMMUNICATIONS NETWORK HAVING TRANSPORT DIVERSITY

(75) Inventors: David Kline, Corvallis, OR (US); Robert B. Taylor, Washougal, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 669 days.

(21) Appl. No.: 11/178,872

(22) Filed: Jul. 10, 2005

(65) Prior Publication Data

US 2007/0008891 A1    Jan. 11, 2007

(51) Int. Cl.
    *H04J 1/16* (2006.01)
(52) U.S. Cl. ...................................... 370/238
(58) Field of Classification Search ................. 370/238, 370/400, 404, 468, 351, 254, 255, 256, 428, 370/396, 397, 411, 392, 466; 709/238, 239, 709/241
    See application file for complete search history.

(56) References Cited

U.S. PATENT DOCUMENTS

| | | | |
|---|---|---|---|
| 5,088,091 A | 2/1992 | Schroeder et al. | |
| 5,233,604 A * | 8/1993 | Ahmadi et al. | 370/238 |
| 5,491,690 A * | 2/1996 | Alfonsi et al. | 370/404 |
| 5,940,372 A * | 8/1999 | Bertin et al. | 370/238 |
| 6,856,592 B2 | 2/2005 | Grover et al. | |
| 7,099,277 B2 * | 8/2006 | Sahinoglu et al. | 370/238 |
| 2003/0212827 A1 | 11/2003 | Saha et al. | |
| 2003/0235175 A1 | 12/2003 | Naghian et al. | |
| 2004/0052252 A1 | 3/2004 | Karaoguz et al. | |
| 2004/0174900 A1 | 9/2004 | Volpi et al. | |
| 2004/0233855 A1 | 11/2004 | Gutierrez et al. | |
| 2005/0041654 A1 | 2/2005 | Lee | |
| 2005/0074019 A1 | 4/2005 | Handforth et al. | |

* cited by examiner

*Primary Examiner*—Chi H Pham
*Assistant Examiner*—Alexander Boakye

(57) ABSTRACT

A system includes nodes and a path selection mechanism. The nodes are interconnected with one another as a mesh network. At least one of the nodes is connected to at least another of the nodes by different transport technologies. The path selection mechanism, in at least one of the nodes, determines an optimal path through the mesh network to transmit data from an originating node to a recipient node.

26 Claims, 3 Drawing Sheets

| | DESTINATION NODE | PATH SEGMENT NODES (TECHNOLOGIES) | BANDWIDTH | RELIABILITY |
|---|---|---|---|---|
| 402A → | 102J | 102M (POWERLINE), 102J (WIRED) | 11 MBPS | 10 |
| 402B → | 102J | 102M (POWERLINE), 102J (WIRELESS) | 9 MBPS | 8 |
| 402C → | 102C | 102M (POWERLINE), 102K (HPN), 102C (POWERLINE) | 5 MBPS | 9 |
| | ⋮ | ⋮ | ⋮ | ⋮ |
| 402P → | 102C | 102H (WIRELESS), 102K (HPN), 102C (POWERLINE) | 5 MBPS | 4 |

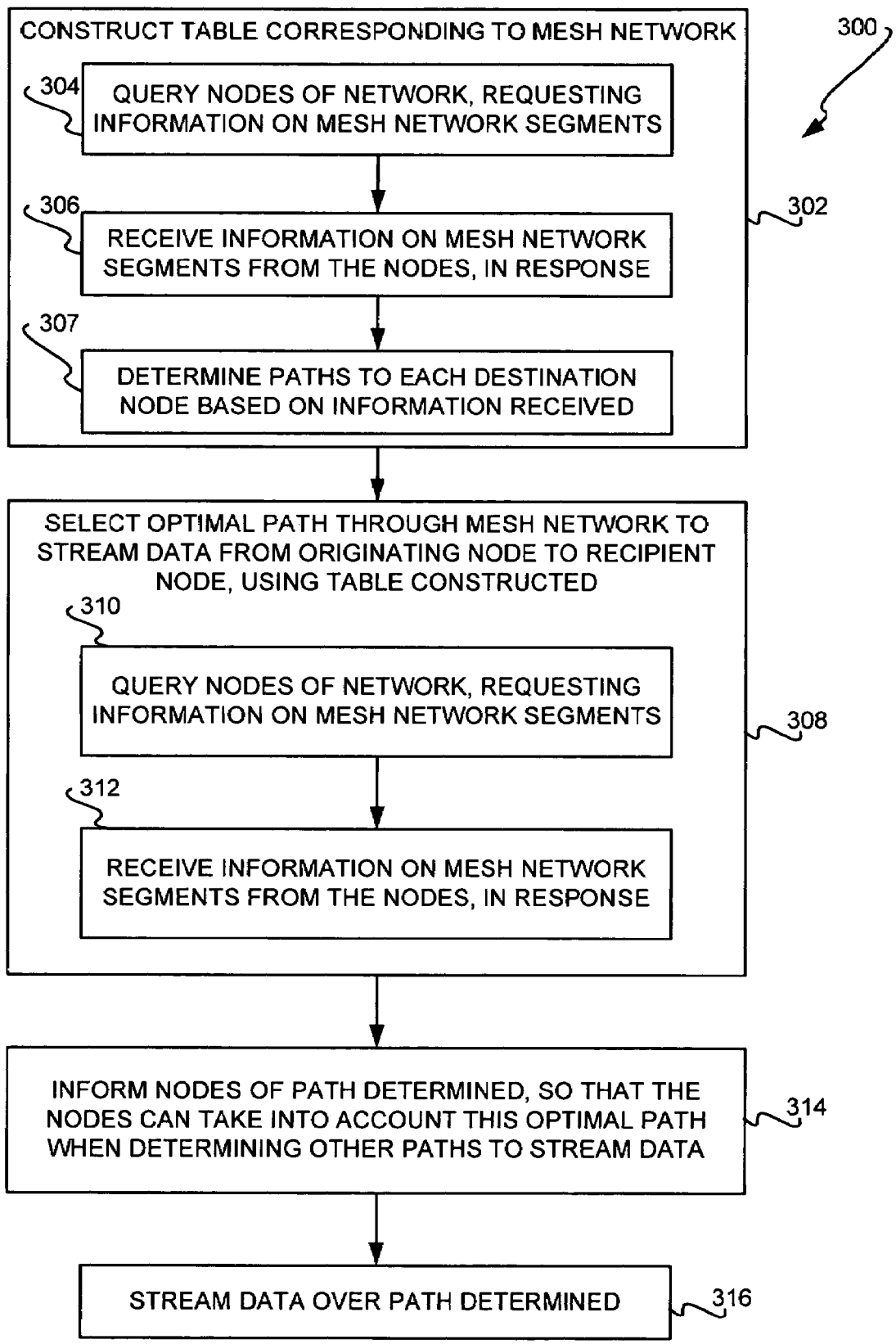

COMMUNICATIONS NETWORK HAVING TRANSPORT DIVERSITY

BACKGROUND

Networking computing devices, or nodes, have become very popular in home environments as well as in office environments. In the home in particular, networking computing devices allow for multimedia and other content to be delivered throughout the home, regardless of which device initially generates or receives the content. For example, a cable television or satellite television set-top box may initially receive video content, which can then be sent to other computing devices located throughout a house. Computing devices as used herein include all types of devices commonly connected to a computer, such as display devices, storage devices, printing devices, and so on, as well as other types of electronic devices, such as audio and video devices, and so on.

Most home networks particularly rely on one or two different transport technologies at most. Two common types of transport technologies are wired Ethernet and wireless Ethernet, or Wi-Fi. A given house usually has the same type of transport technology used throughout. Even if two or more different transport technologies are employed, however, a given device usually is connected to the network using just one transport technology. The only exceptions are specialized bridge devices that connect, or bridge, the different transport technologies.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated.

FIG. 3 is a flowchart of a method for determining an optimal path for streaming data between two nodes within the mesh network of FIG. 1, according to an embodiment of the invention.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1:
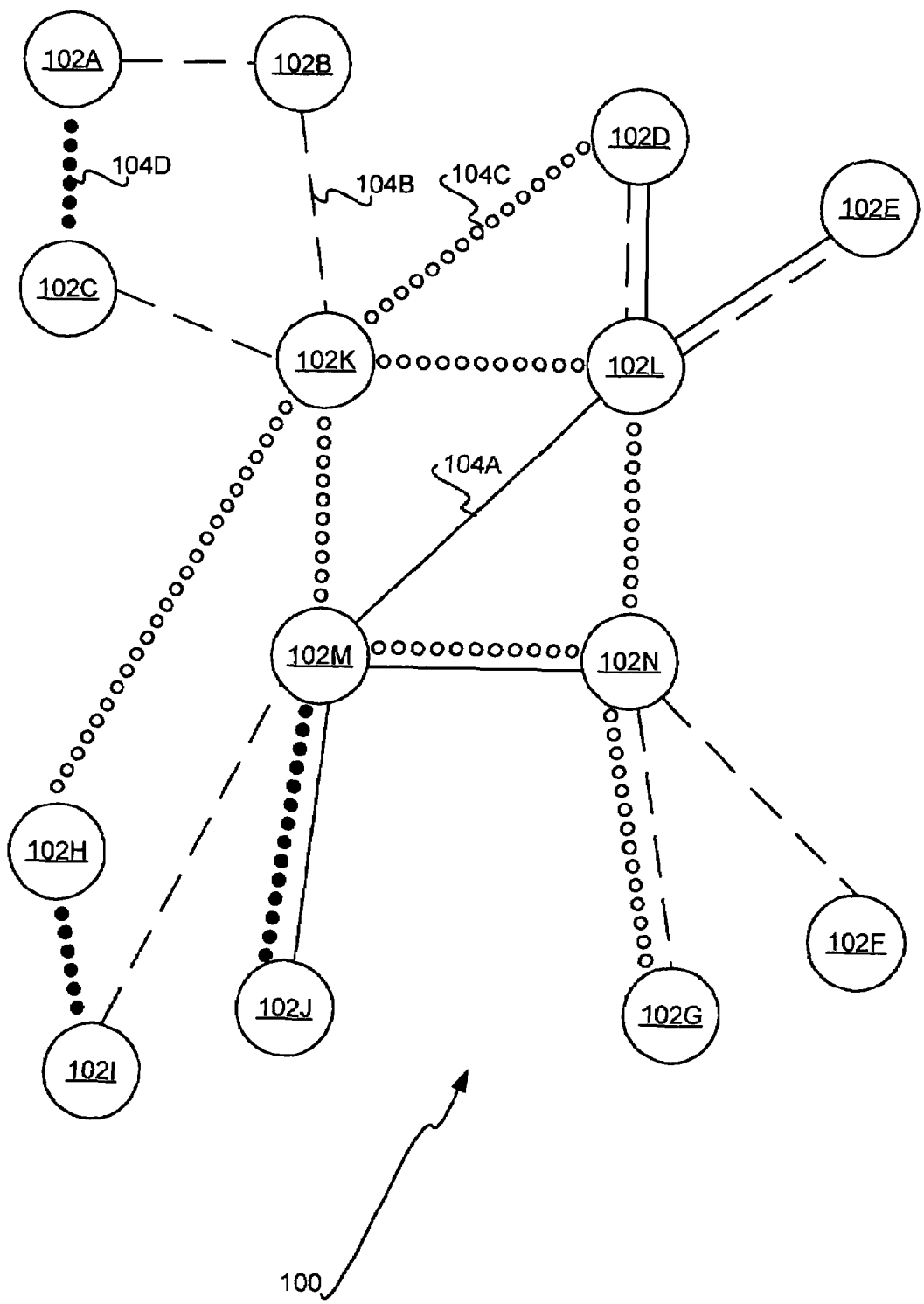
FIG. 1 is a diagram of an example system in which there are a number of nodes interconnected with one another as a mesh network, with some of the nodes connected to one another by one or more different transport technologies, according to an embodiment of the invention.

FIG. 1 shows a representative and example system 100, according to an embodiment of the invention. The system 100 includes a number of nodes 102A, 102B, . . . , 102N, collectively referred to as the nodes 102, interconnected with one another as a mesh network. Each of the nodes 102 is a computing device, where the terminology computing device is intended in a broad and encompassing sense. Examples of computing devices include desktop and laptop computers, personal digital assistant (PDA)-type devices, mobile and landline telephones, printing devices, television set-top boxes, displays like televisions and projectors, speakers, digital camera devices, digital frames, and video devices, among other types of devices. That is, computing devices as used herein include all types of devices commonly connected to a computer, such as display devices, storage devices, printing devices, and so on, as well as other types of electronic devices, such as audio and video devices, and so on. In general, a computing device may be considered a communicatively connected electronic device with sufficient computing power to perform the functionality described herein. The nodes 102 are computing devices in that they having sufficient computing power to perform the functionality ascribed to the nodes 102 later in the detailed description.

The nodes 102 are interconnected as a mesh network, where a mesh network is defined as at least some of the nodes 102 having more than one network segment extending therefrom, such that such nodes are interconnected with more than one other node. For example, the node 102C has a mesh network segment extending to the node 102A and another mesh network segment extending to the node 102K, such that the node 102C is directly interconnected with the nodes 102C and 102K. A mesh network is further defined as all of the nodes 102 being at least indirectly interconnected with one another. For example, the node 102C is interconnected indirectly with the node 102N, through the mesh network segment connecting the nodes 102C and 102K, the mesh network segment connecting the nodes 102K and 102M, and the mesh network segment connecting the nodes 102M and 102N. For the node 102C to communicate with the node 102N, then, the data sent from the node 102C may traverse the nodes 102K and 102M to reach the node 102N.

Different transport technologies are used to connect different nodes 102 with one another via mesh network segments. A transport technology is a networking technology that can be employed to interconnect two nodes for communication purposes. Different transport technologies that can be employed include, but are not limited to: wired Ethernet, or IEEE 802.3; wireless Ethernet, Wi-Fi®, or IEEE 802.11/a/b/g; powerline, or HomePlug®; FireWire®, or IEEE 1394; home phoneline networking (HPN); and, Bluetooth, as well as other different types of transport technologies. There are four different transport technologies used in the example system 100 of FIG. 1, represented as solid lines connecting nodes, dashed lines connecting nodes, solid-dotted lines connecting nodes, and hollow-dotted lines connecting nodes. For example, the mesh network segment 104A connecting the nodes 102L and 102M uses a first transport technology represented as a solid line, whereas the mesh network segment 104B connecting the nodes 102B and 102K uses a second transport technology represented as a dash line. The mesh network segment 104C connecting the nodes 102D and 102K uses a third transport technology represented as a hollow-dotted line, and the mesh network segment 104D connecting the nodes 102A and 102C uses a fourth transport technology represented as a solid-dotted line.

At least some of the nodes 102 are interconnected with one another via more than one different transport technology. For example, the nodes 102J and 102M are interconnected with one another via different transport technologies represented as a solid-dotted line and a solid line, and the nodes 102M and 102N are interconnected with one another via different transport technologies represented as a hollow-dotted line and a solid line. Therefore, when the node 102J is to communicate with the node 102M, for instance, it has the option of communicating over the transport technology represented as a solid-dotted line, or the transport technology represented as a solid line. The nodes 102D and 102L, the nodes 102E and 102L, and the nodes 102N and 102G are also interconnected with one another via different transport technologies.

Furthermore, between at least one pair of the nodes 102 that are indirectly interconnected through the mesh network, there is more than one path for data to traverse the mesh network from the originating node to the recipient node of the node pair. For example, the pair of nodes 102K and 102N has at least two paths for data to traverse the mesh network from the node 102K to the node 102N. First, data may be sent from the node 102K, through the node 102M, and to the node 102N. Second, data may be sent from the node 102K, through the node 102L, and to the node 102N. Data may further be sent from the node 102K, to the node 102L, to the node 102M, and finally to the node 102N, as well as from the node 102K, to the node 102M, to the node 102L, and finally to the node 102N.

At least some of the nodes 102 have routing capability to route data received by the node on one mesh network segment extending from the node, to another mesh network segment extending from the node. For example, the node 102K may receive data over the mesh network segment connecting the node 102K with the node 102H. The node 102K may be requested to route this data over the mesh network segment connecting the node 102K with the node 102M. Thus, the node 102K in this example has routing capability, and is capable of receiving data that is not intended for the node 102K, but rather is passed through the node 102K, from the node 102H to the node 102M. The routing capability may be accomplished over the same type of transport technology, or over different types of transport technologies. In the example, the network segments extending from the node 102K to the nodes 102H and 102M both employ the same type of transport technology, represented as hollow-dotted lines.

Furthermore, at least some of the nodes 102 have bridging capability to bridge different types of transport technologies when routing data from one mesh network segment to another mesh network segment. For example, the node 102K may receive data over the mesh network segment connecting the node 102K with the node 102C, and be requested to route this data over the mesh network segment connecting the node 102K with the node 102M. Thus, the node 102K in this example has routing capability, because it is capable of receiving data that is not intended for the node 102K, but rather is passed through the node 102K, from the node 102C to the node 102M. Furthermore, the node 102K has bridging capability, because it is capable of receiving data over one type of transport technology, that of the network segment between the nodes 102K and 102C represented by a dashed line, and sending the data over another type of transport technology, that of the network segment between the nodes 102K and 102M represented by a hollow-dotted line.

Figure 2:
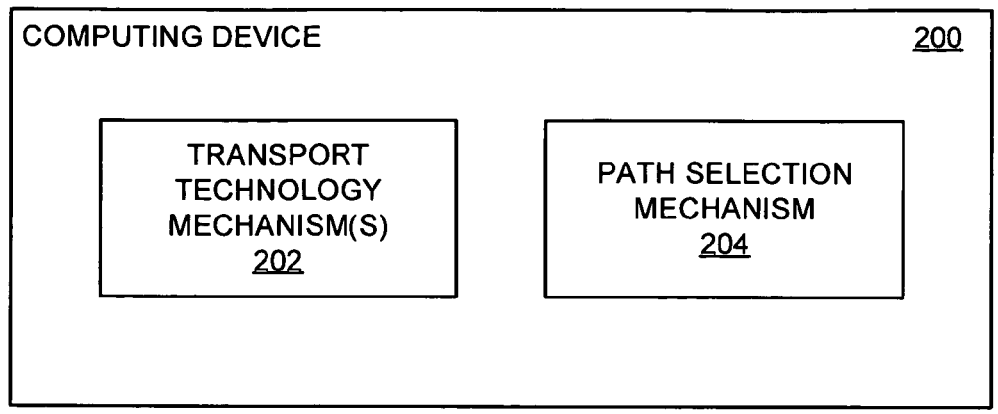
FIG. 2 is a block diagram of an example computing device that can implement one or more of the nodes of the system of FIG. 1, according to an embodiment of the invention.

FIG. 2 shows a block diagram of a representative computing device 200 that can implement each of the nodes 102, according to an embodiment of the invention. The computing device 202 is depicted as including one or more transport technology mechanisms 202, as well as a path selection mechanism 204. The transport technology mechanisms 202 are each implemented in hardware, or a combination of software and hardware, whereas the path selection mechanism 204 may be implemented in software, hardware, or a combination of software and hardware. As can be appreciated by those of ordinary skill within the art, the computing device 202 can and typically does have additional components, besides those depicted in FIG. 2.

The transport technology mechanisms 202 enable the computing device 200 to communicate with other nodes, and thus to establish mesh network segments. For example, where the computing device 200 implements the node 102C of FIG. 1, there is one transport technology mechanism within the node 102C to establish the mesh network segment from the node 102C to the node 102A, with the node 102A also having a transport technology mechanism using the same transport technology. There is another transport technology mechanism within the node 102C to establish the mesh network segment from the node 102C to the node 102K, with the node 102K also having a transport technology mechanism using the same transport technology. The transport technology mechanisms 202 are thus each hardware, or hardware and software, which enable communication over a corresponding transport technology. In the example, the transport technology mechanism that establishes the mesh network segment from the node 102C to the node 102K may be a wired Ethernet adapter, whereas the transport technology mechanism that establishes the mesh network segment from the node 102C to the node 102K may be a wireless Ethernet transceiver.

The path selection mechanism 204 determines an optimal path through a mesh network to stream data from the computing device 200 to a recipient node indirectly or directly reachable through the mesh network. In so doing, the path selection mechanism 204 may, in conjunction with the transport technology mechanisms 202, provide the computing device 200 with the routing and bridging capabilities that have been described. Data streaming is a transmission of data from an originating node to a recipient node that is structured and processed as a continuous flow. Such data can be audio data or video data, for instance. Data streaming is compared to other types of data transmission in that the data needs to arrive at the recipient node in a timely manner, so that it can be played back as the data is being streamed.

For instance, it is common but not required that once video data has begun to be streamed to a recipient node, after a few seconds or more of the data has been received by and buffered at the recipient node, the playback of the video data starts at the recipient node. Thus, the other portions of the data have to be timely received by the recipient node, or otherwise the playback of the video data will intermittently pause in an undesirable manner. By comparison, the non-streaming transmission of data does not have as significant of time constraints, since typically no part of the data is presented to the user until all the data has been received. For example, a user may download a data file to a recipient node from an originating node. If some portions of the data file arrive out of order, or arrive more quickly than other portions, the user is not affected, because the data file is reassembled at the recipient node and not presented to the user until all the portions have arrived.

The optimal path may be determined by the path selection mechanism 204 using a variety of different techniques, including existing "best path" algorithms, and/or using a table representing the mesh network as is described later in the detailed description. In general, the path from an originating node to a recipient node, for streaming data through the mesh network, is selected based on the quality-of-service (QoS) requirements of the data being streamed, to ensure that there are no intermitted pauses as the data is played back at the recipient node. The QoS requirements may include jitter, latency, as well as other types of requirements. Furthermore, the path is cooperatively determined between the path selection mechanism 204 of the computing device 200 and the other nodes, based on information provided by the nodes, so that current dynamic conditions of the mesh network—such as data currently traversing the network, currently available bandwidth, and so on—may be taken into account when selecting a path. The path that is selected may further be an efficient use of the bandwidth that is available. Thus, where there is one path having 15 megabits per second (mbps) of bandwidth and another path having 100 mbps of bandwidth, but only 10 mbps of bandwidth is needed, the former path may be selected over the latter path.

FIG. 3 shows a method 300 for determining an optimal path from an originating node to a recipient node for streaming data from the originating node to the recipient node, according to a specific embodiment of the invention. The method 300 may be performed by the nodes 102 of the system 100 of FIG. 1, and specifically by the path selection mechanism 204 of the computing device 200 of FIG. 2. The method 300 may further be implemented as one or more computer program parts of a computer program stored on a computer-readable medium. The medium may be a volatile or a non-volatile medium, and further may be a semiconductor, magnetic, and/or optical computer-readable medium, among other types of computer-readable media.

Figure 4:
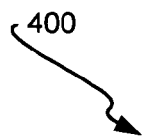
FIG. 4 is a diagram of a table that can be constructed and maintained by each of the nodes within the mesh network of FIG. 1, to assist the nodes in determining optimal paths for streaming data, according to an embodiment of the invention.

The method 300 first constructs a table, or another type of data structure, corresponding to the mesh network (302). The table in effect defines the mesh network, so that the method 300 is able to determine an optimal path through the mesh network. FIG. 4 shows an example table 400 that may be constructed in 302 of the method 300, according to an embodiment of the invention. The table 400 has a number of entries 402A, 402B, 402C, . . . , 402P, collectively referred to as the entries 402. The entries 402 in one embodiment correspond to potential paths to a destination node from an originating node. As such, in this embodiment a different table 400 is constructed at each of the nodes 102, where the entries 402 of a table 400 for a given originating node define the paths to each other node from this originating node. For each unique path to a destination node from the originating node to which the table 400 corresponds, there is a separate entry within the table 400. Each of the entries 402 specifies an ordering of the nodes that define the mesh network segments of a path from the originating node to a destination node and the corresponding transport technologies used to implement the segments, the minimum bandwidth of the path (which is the lowest bandwidth of any segment along the path), and the reliability of the path, as will be described in more detail by way of example. As can be appreciated by those of ordinary skill within the art, the entries 402 may specify other information, in addition to and/or in lieu of that depicted in FIG. 4.

In one embodiment, the reliability of the path is denoted as a scaled score between 1 and 10, where a score of 10 denotes a path that is very reliable, and a score of 1 denotes a path that is very unreliable. The reliability score may be obtained by tracking all the data traffic that attempts to use the path in question, and determining what percentage of the data traffic actually traverses the path in the first attempt. Thus, a score of 10 means that on average 100% of the data transmitted over the segment traverses the path in the first attempt, whereas a score of 1 means that on average 10% of the data transmitted over the path traverses the path in the first attempt. Other measures of reliability may also be employed.

The particular entries 402 depicted in the table 400 of FIG. 4 correspond to paths of the mesh network of FIG. 1 from the node 102I as the originating node as one example. For example, the entries 402A and 402B correspond to paths from the node 102I to the node 102J as the destination node. The first entry 402A specifies a path from the node 102I to the node 102M via a powerline transport technology, and then from the node 102M to the destination node 102J via a wired transport technology. As such, there are two mesh network segments within the path defined by the entry 402A: the mesh network segment between the originating node 102I and the node 102M, and the mesh network segment between the node 102M and the destination node 102J. The bandwidth of the path of the entry 402A is 11 megabits per second (11 mbps), because that is the lowest bandwidth of any of the mesh network segments of the path. For instance, the bandwidth of the segment between the nodes 102I and 102M may be 11 mbps, corresponding to the bandwidth of the powerline transport technology, whereas the bandwidth of the segment between the nodes 102M and 102I may be 100 mbps, corresponding to the bandwidth of the wired transport technology. The reliability of the path of the entry 402A is specified as 10.

The second entry 402B also specifies a path from the node 102I to the destination node 102J, via a mesh network segment from the node 102I to the node using via a powerline transport technology, and then via a mesh network segment from the node 102M to the destination node 102J using a wireless transport technology. Thus, the path of the entry 402B specifies the same nodes as the entry 402A, but the entry 402B specifies a wireless transport technology between the nodes 102M and 102J, whereas the entry 402A specifies a wired transport technology between the nodes 102M and 102J. The bandwidth of the path of the entry 402B is 9 mbps, because that is the lowest bandwidth of any of the mesh network segments of the path. The reliability of the path of the entry 402B is specified as 8.

As another example, the entries 402C and 402D correspond to paths from the node 102I to the node 102C. The entry 402C specifies a path from the node 102I to the node 102M via a powerline transport technology, from the node 102M to the node 102K via a home-phone line networking (HPN) transport technology, and from the node 102K to the destination node 102C via a powerline transport technology. There are thus three mesh network segments within the path defined by the entry 402C: the segment between the originating node 102I and the node 102M, the segment between the nodes 102M and 102K, and the segment between the node 102K and the destination node 102C. The bandwidth of the path of the entry 402C is 5 mbps, because that is the lowest bandwidth of any of the mesh network segments of the path. The reliability of the path of the entry 402C is specified as 9.

The entry 402D also specifies a path from the node 102I to the destination node 102C, via a segment from the node 102I to the node 102H using a wireless transport technology, via a segment from the node 102H to the node 102K using an HPN transport technology, and then via a segment from the node 102K to the node 102C via a powerline technology. Thus, the path of the entry 402D reaches the same destination node 102C as the path of the entry 402C does, but the nodes that are traveled through are different in the two paths. In the path of the entry 402C, data travels from the node 102I, to the node 102M, to the node 102K, and finally to the node 102C, whereas in the path of the entry 402D, data travels from the node 102I, to the node 102H, to the node 102K, and finally to the node 102C. The bandwidth of the path of the entry 402D is 5 mbps, and the reliability of this path is specified as 4. Referring back to FIGS. 3, 304, 306, and 307 of the method 300 may be performed in one embodiment to construct the table 400 of FIG. 4. First, the method 300 queries all the nodes that are able to communicate over the mesh network in question (304), requesting information on the mesh network segments extending therefrom. In response, the method 300 receives the requested information regarding the mesh network segments from the nodes (306). It is noted that for each mesh network segment, the requested information will be received twice, from each node of the node pair of that segment. Furthermore, it is noted that as mesh network segments are created and are removed, such as by nodes and/or network technologies being added to or removed from the mesh network, existing nodes being removed from the network, such information is exchanged among the nodes. The exchange of such information allows the table 400 to be updated, on a continual or a periodic basis, to ensure that the table 400 accurately reflects the paths through the mesh network that can be used to reach a destination node from an originating node.

For example, with respect to the mesh network of FIG. 1, the node 102H will report back information regarding the network segment between it and the node 102K, as well as information regarding the network segment between it and the node 102I. However, the node 102K will also respond with information regarding the network segment between the nodes 102H and 102K, and the node 102I will also respond with information regarding the network segment between the nodes 102H and 102I. The method 300 may use this duplicative information provided to verify the information regarding each network segment, such that if the information provided by the two nodes of a mesh network segment is inconsistent, then the nodes are again requested to provide the information.

After the information has been received in 306, all the paths from the originating node corresponding to the table 400 to each of the other nodes, as destination nodes, are determined (307), such that the table 400 is constructed with entries 402 corresponding to these paths. Any existing path determination algorithm can be employed to construct the paths from the originating node to each of the other nodes. Such algorithms may detect, for instance, that circular paths are being generated, and may delete such paths. Such algorithms may further limit the number of nodes that are traversed within the path to a predetermined number, so that circuitous paths are avoided.

It is noted that the table initially constructed in 302 of the method 300 of FIG. 3 using static information. That is, the information provided in the entries 402 of the table 400 of FIG. 4, with the possible exception of the reliability scores, is information that is the same regardless of the current network traffic over the mesh network of FIG. 1. For example, regardless of whether there is a large amount of network traffic over the mesh network or not, the bandwidth between the wireless mesh network segment between the nodes 102J and 102M is always 11 mbps, and is always a wireless mesh network segment. As will be described, the nodes 102 may be subsequently requeried to provide more dynamic oriented information.

Using the table that has been constructed, the method 300 is then able to select the optimal path through the mesh network to stream data from an originating node to a recipient node (308). For example, the node 102I may wish to stream data to the node 102J within the mesh network of FIG. 1, where the node 102I is indirectly connected to the node 102J through the mesh network, and not directly connected to the node 102J through the network. Based on the table that it has constructed, the node 102I may construct two shortest paths using existing "best path" algorithms: a path from the node 102I, to the node 102M, and to the node 102J; and, a path from the node 102H to the node 102K, to the node 102M, and to the node 102J. Although the first path is shortest, this path may nevertheless be discounted, using an existing optimization or path-decision technique, because the mesh network segment between 102I and 102M may be highly unreliable. Furthermore, with respect to the second path, the wired network segment between the nodes 102M and 102J may be selected, because the wired network segment provides for greater bandwidth.

Thus, embodiments of the invention are not particularly limited in the manner by which the optimal path for streaming data between two nodes of the mesh network is selected. The path that is used to stream data between two nodes is further a priori determined before any of the data is streamed, so that once the data is streamed, each node along the path knows to which node it should forward the streaming data. In the example optimal path of the previous paragraph between the nodes 102I and 102J, the node 102I will thus stream data to the node 102J by sending the data to the node 102H, instructing the node 102H to send the data to the node 102K. The node 102K receives the data, and has instructions to send the data to the node 102M. Finally, the node 102M receives the data, and has instructions to send the data over the wired transport technology between it and the recipient node 102J.

As has been described, the table 400 is initially constructed using static information regarding the mesh network. Therefore, as part of the optimal path determination process in 308, the method 300 may perform 310 and 312 to update the table 400 with dynamic information. Thus, the nodes of the network are required to provide updated information regarding the mesh network segments of the paths within the table 400 (310), such that in response such updated information is received from the nodes (312). In addition, new information regarding the mesh network segments may be received, such that the table 400 is updated based on this new information as well, which may include deleting existing entries, adding new entries, and/or updating existing entries within the table 400.

The updated information may include such dynamic information such as updated reliability scores regarding the mesh network segments, where the two nodes of a given mesh network segment may continuously or periodically tally and determine the reliability score for the segment. The dynamic information may further include whether a given network segment is currently non-operational, and/or the current network traffic load of a given network segment. Other dynamic information may also be acquired. In general, such dynamic and changing information is therefore useful in determining the optimal path within the mesh network to stream data.

Still referring to FIG. 3, once the optimal path has been determined, the method 300 informs all of the nodes within the mesh network of the path (314). Therefore, the other nodes can take this into account when determining other paths within the mesh network over which to stream other data. For example, if a given optimal path will be used to stream a 100 mbps stream of video data, using certain mesh network segments, for twenty minutes, these mesh network segments may not be completely available to stream other data. Therefore, providing the nodes with this information allows them to take the information into account when determining their own paths for streaming data over the mesh network.

Finally, the method 300 concludes by actually streaming the data over the optimal path that has been determined (316). The data may be streamed in packets of data, where each packet can in one embodiment include the list of nodes that are to be traversed within the mesh network to reach the recipient node from the originating node, as well as the transport technologies that are to be used to send or forward the data packets to the next node. This list of nodes effectively defines the optimal path within the mesh network. For example, node 102C of FIG. 1 may wish to stream data to the node 102N, such that an optimal path is determined through the nodes 102K and 102M. The list of nodes of the optimal path is thus specified as the nodes 102K, 102M, and 102N in that order.

Therefore, the node 102C begins sending data packets to the node 102K. The node 102K, for each packet received, reviews the packet to determine that it should forward the packet to the node 102M. Similarly, the node 102M reviews each packet to determine that it should forward the packet to the node 102N, which is the recipient node of the data stream. Furthermore, because two different mesh network segments, employing different transport technologies, exist between the nodes 102M and 102N, the data packets also specify the transport technology that should be used to send the data between the nodes 102M and 102N.

The method 300 may include other parts, besides those depicted in FIG. 3. For instance, while the data is being streamed, a given mesh network segment may become unavailable, due to failure or another cause. In such instance, one of the nodes of the node pair of this mesh network segment may report back to the originating node performing the method 300 that the optimal path should be redetermined by, for instance, reperforming at least some parts of the method 300. Alternatively, when a node receives a data packet and is instructed by that data packet to forward the packet over a mesh network segment that no longer is available, may forward the packet to a different node. The data packet thus travels over the mesh network, until the recipient node is reached.

It is thus noted that, although specific embodiments have been illustrated and described herein, it will be appreciated by those of ordinary skill in the art that any arrangement calculated to achieve the same purpose may be substituted for the specific embodiments shown. For example, embodiments of the invention have been substantially described in relation to streaming data between nodes within a mesh network of nodes. However, other embodiments of the invention can be employed in relation to other types of data transmission, such as web browsing, file transfer, email acquisition, and so on. This application is thus intended to cover any adaptations or variations of the disclosed embodiments of the present invention. For instance, the embodiments of the invention that have been described in relation to data streaming are also equally applicable to other embodiments of the invention in which other types of data transmission occur. Therefore, it is manifestly intended that this invention be limited only by the claims and equivalents thereof.

We claim:

1. A system comprising:
a plurality of nodes interconnected with one another as a mesh network, a first node being directly connected to a same second node by a plurality of different transport technologies, such that there are no nodes in-between the first node and the second node; and,
a path selection mechanism in at least one of the nodes to determine an optimal path through the mesh network to transmit data from an originating node to a recipient node, such that the path selection mechanism in the first node is to determine an optimal path through the mesh network that includes traversal from the first node to the second node by selecting one of the different transport technologies that directly connect the first node to the second node.

2. The system of claim 1, wherein at least one pair of the nodes has more than one path within the mesh network interconnecting the nodes.

3. The system of claim 1, wherein each node has routing capability to route data received by the node on a first mesh network segment extending from the node to one of at least one second mesh network segment extending from the node.

4. The system of claim 1, wherein at least one of the nodes each has a plurality of mesh network segments extending from the node that have different corresponding transport technologies, each such node having bridging capability to send data received by the node on a first mesh network segment extending from the node and having a first corresponding transport technology to one of at least one second mesh network segment extending from the node and having a second corresponding transport technology.

5. The system of claim 1, wherein each node, in response to being queried, provides information regarding at least:
a number of mesh network segments extending from the node, each mesh network segment having a corresponding transport technology;
the corresponding transport technology of each mesh network segment;
available bandwidth within each mesh network segment; and,
reliability of each mesh network segment.

6. The system of claim 5, wherein the information comprises at least one of static information and dynamic information regarding the mesh network.

7. The system of claim 1, wherein the path selection mechanism is to maintain a data structure corresponding to the mesh network, the data structure having a number of entries corresponding to a plurality of paths within the mesh network, each path comprising one or more mesh network segments having corresponding transport technologies, each entry comprising:
an ordering of nodes traversed by the path to which the entry corresponds, and defining the mesh network segments;
the corresponding transport technology of each mesh network segment;
bandwidth within the path; and,
reliability of the path.

8. The system of claim 1, wherein the path selection mechanism is to cooperatively determine the optimal path based on information provided by the nodes, such that the path selection mechanism queries the nodes for information regarding mesh network segments extending from the nodes.

9. The system of claim 1, wherein the path selection mechanism is to inform the nodes the optimal path determined so that the nodes take into account the optimal path when determining other paths to transmit data.

10. The system of claim 1, wherein the path selection mechanism is to determine the optimal path based on quality-of-service (QoS) requirements of the data being transmitted to the recipient node.

11. A system comprising:
a plurality of nodes interconnected with one another as a mesh network, a first node being directly connected to a same second node by a plurality of different transport technologies, such that there are no nodes in-between the first node and the second node; and,
means for determining an optimal path through the mesh network to transmit data from an originating node to a recipient node, such that the means is to determine an optimal path through the mesh network from the first node that includes traversal of the second node by selecting one of the different transport technologies that directly connect the first node to the second node.

12. The system of claim 11, wherein at least one pair of the nodes has more than one path within the mesh network interconnecting the nodes.

13. The system of claim 11, wherein the means is further for maintaining a data structure corresponding to the mesh network, the data structure having a number of entries corresponding to a plurality of paths within the mesh network, each path comprising one or more mesh network segments having corresponding transport technologies, each entry comprising:

an ordering of nodes traversed by the path to which the entry corresponds, and defining the mesh network segments;
the corresponding transport technology of each mesh network segment;
bandwidth within the path; and,
reliability of the path.

14. A computing device capable of being a node interconnected with other nodes within a mesh network, comprising:

a plurality of different transport technology mechanisms, each different transport technology mechanism corresponding to a mesh network segment of the mesh network and directly connecting the computing device to a same other node such that there are no nodes in-between the computing device and the other node; and,
a path selection mechanism to determine an optimal path through the mesh network to transmit data from the computing device to a recipient node, such that where the optimal path includes the other node, the path selection mechanism is to select one of the different transport technologies that directly connect the computing device to the other node.

15. The computing device of claim 14, wherein the path selection mechanism provides the computing device with:

routing capability to route data received by the computing device on a first mesh network segment extending from the node to one of at least one second mesh network segment extending from the node; and,
bridging capability to send data received by the computing device on a first mesh network segment extending from the node and having a first corresponding transport technology to one of at least one second mesh network segment extending from the node and having a second corresponding transport technology.

16. The computing device of claim 14, wherein the path selection mechanism is to maintain a data structure corresponding to the mesh network, the data structure having a number of entries corresponding to a plurality of paths within the mesh network, each path comprising one or more mesh network segments having corresponding transport technologies, each entry comprising:

an ordering of nodes traversed by the path to which the entry corresponds, and defining the mesh network segments;
the corresponding transport technology of each mesh network segment;
bandwidth within the path; and,
reliability of the path.

17. A computing device capable of being a node interconnected with other nodes within a mesh network, comprising:

a plurality of different transport technology mechanisms, each different transport technology mechanism corresponding to a mesh network segment of the mesh network and directly connecting the computing device to a same other node such that there are no nodes in-between the computing device and the other node; and,
means for determining an optimal path through the mesh network to transmit data from the computing device to a recipient node, such that where the optimal path includes the other node, the means is to select one of the different transport technologies that directly connect the computing device to the other node.

18. A method comprising:

constructing a data structure having a number of entries corresponding to a plurality of paths of a mesh network, each path comprising one or more mesh network segments having corresponding transport technologies, where at least two of the mesh network segments directly connect a first node to a same second node such that there are no nodes in-between the first node and the second node, and where the at least two of the mesh network segments have different transport technologies in directly connecting the first node to the second node; and,
determining an optimal path through the mesh network to transmit data from an originating node to a recipient node indirectly connected to one another through the mesh network, employing the data structure constructed, such that where the optimal path includes the first node and the second node, one of the different transport technologies directly connecting the first node to the second node is selected.

19. The method of claim 18, wherein each entry of the data structure comprises:

an ordering of nodes traversed by the path to which the entry corresponds, and defining the mesh network segments;
the corresponding transport technology of each mesh network segment;
bandwidth within the path; and,
reliability of the path.

20. The method of claim 18, further comprising querying each node interconnected by the mesh network to receive static information and/or dynamic information regarding network segments connecting the node.

21. The method of claim 20, further comprising, in response to querying each node, receiving from each node the information comprising:

a number of mesh network segments extending from the node;
the corresponding transport technology of each mesh network segment;
available bandwidth within each mesh network segment; and,
reliability of each mesh network segment.

22. The method of claim 18, wherein determining the optimal path through the mesh network comprises cooperatively determining the optimal path based on information provided by the nodes interconnected by the mesh network.

23. The method of claim 18, wherein determining the optimal path through the mesh network comprises determining the optimal path based on quality-of-service (QoS) requirements of the data being transmitted.

24. The method of claim 18, further comprising informing the nodes interconnected by the mesh network of the optimal path determined so that the nodes take into account the optimal path when determining other paths to transmit data.

25. A computer-readable medium having a computer program stored thereon comprising:

a first computer program part to construct a data structure having a number of entries corresponding to a plurality of paths of a mesh network, each path comprising one or more mesh network segments having corresponding transport technologies, where at least two of the mesh network segments directly connect a first node to a same second node such that there are no nodes in-between the first node and the second node, and where the at least two of the mesh network segments have different transport technologies in directly connecting the first node to the second node; and, a second computer program part to determine an optimal path through the mesh network to transmit data from an originating node to a recipient node indirectly connected to one another through the mesh network, employing the data structure constructed, such that where the optimal path includes the first node and the second node, one of the different transport technologies directly connecting the first node to the second node is selected.

26. The computer-readable medium of claim 25, wherein each entry of the data structure comprises:

an ordering of nodes traversed by the path to which the entry corresponds, and defining the mesh network segments;

the corresponding transport technology of each mesh network segment;

bandwidth within the path; and, reliability of the path.

* * * * *

UNITED STATES PATENT AND TRADEMARK OFFICE
CERTIFICATE OF CORRECTION

PATENT NO. : 7,474,620 B2 Page 1 of 1
APPLICATION NO. : 11/178872
DATED : January 6, 2009
INVENTOR(S) : David Kline et al.

It is certified that error appears in the above-identified patent and that said Letters Patent is hereby corrected as shown below:

In column 12, line 20, in Claim 18, delete "in directly" and insert -- indirectly --, therefor.

In column 13, line 10, in Claim 25, delete "in directly" and insert -- indirectly --, therefor.

Signed and Sealed this

Twenty-third Day of June, 2009

JOHN DOLL
*Acting Director of the United States Patent and Trademark Office*